Nov. 23, 1965    S. V. PUIDOKAS    3,218,885
REAR AXLE ASSEMBLY
Filed Jan. 21, 1963    2 Sheets-Sheet 1

INVENTOR.
STANLEY V. PUIDOKAS
BY
Carl J. Barbee
ATTORNEY

Nov. 23, 1965  S. V. PUIDOKAS  3,218,885
REAR AXLE ASSEMBLY
Filed Jan. 21, 1963  2 Sheets-Sheet 2

INVENTOR.
STANLEY V. PUIDOKAS
BY
Carl J. Barbee
ATTORNEY

United States Patent Office 3,218,885
Patented Nov. 23, 1965

3,218,885
REAR AXLE ASSEMBLY
Stanley V. Puidokas, Kenosha, Wis., assignor to American Motors Corporation, Kenosha, Wis., a corporation of Maryland
Filed Jan. 21, 1963, Ser. No. 252,891
4 Claims. (Cl. 74—607)

The invention relates to the axle assembly of a vehicle.

An object of the invention is to provide an improved bearing, seal and seal retainer arrangement for an axle assembly.

Another object is to provide a seal and seal retainer assembly in which the seal includes a rigid annular ring which also serves as an end support for the bearing.

Other objects and advantages of the invention will be apparent from the ensuing specification and appended drawings in which.

The axle assembly, in general, includes a differential housing A with conventional gearing B contained therein for driving the left and right axle shafts C and D respectively. The outer ends of each of the axle shafts include the bearing and seal assemblies E and F and the wheel hubs G and H are removably anchored to the outer ends of the respective axle shafts.

In an axle assembly, as hereinbefore generally described, it is necessary to provide for axial end play in the overall assembly and such end play should be in the range of .004″ to .008″ with a desired clearance being .006″. An explanation concerning end play will be set forth more fully hereinafter.

Figure 3:
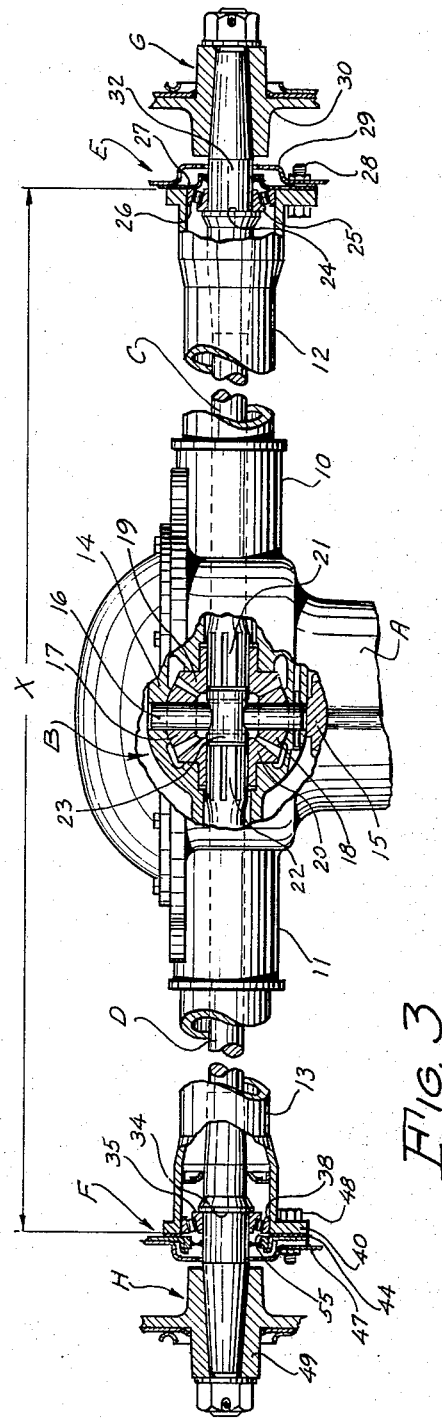
FIGURE 3 is a fragmentary sectional plan view of the completed axle assembly.

Referring to FIGURE 3, the differential housing is provided at either side with outwardly extending tubular extensions 10 and 11 into which the inner ends of the axle tubes 12 and 13 are telescopically received. The axle tubes are rigidly anchored within the differential housing extensions as by means of welding and the dimension X (from one end face of one axle tube to the other end face of the other axle tube) is rather closely held since it is involved in the ultimate end play.

The differential gearing may be of conventional construction including a ring gear 14 having its teeth (not shown) meshing with the teeth on the pinion gear 15 which is the driving gear for the entire axle assembly. The drive shaft which actuates the pinion gear is not shown since it forms no part of the invention.

A pin 16 is anchored to the ring gear and carries the gears 17 and 18 which mesh with the axle shaft gears 19 and 20. The splined ends 21 and 22 of the axle shafts are received within the complementary grooves in the gears 19 and 20. The inner end of each axle shaft abuts against the opposite ends of a thrust block 23 which has a diametric slot therein through which the pin 16 projects. Viewing FIGURE 3, it will be noted that the slot in the thrust block is elongated slightly (as indicated by dotted lines) in a direction axially of the axle shafts to permit a slight axial movement of the thrus block during assembly of the overall axle assembly and during activation of the end play movement which occurs when the axle assembly is in use. Each axle shaft, in the vicinity of the splined inner ends, is mounted in a bearing (not shown) supported in the differential housing. The foregoing description of the differential housing and gearing identifies a conventional rear axle assembly construction of an automobile.

At the outer end of the axle shaft C, an annular shoulder 24 is formed and the inner race 25 of the tapered roller bearing abuts said shoulder. The outer race 26 is held against axial displacement by the seal retainer 27 which is anchored to the end face of the axle tube as by means of bolts 28. The brake shoe carrying plate 29 (a portion of which only is shown) is likewise anchored to the end of the axle tube by means of the bolts 28. The wheel hub 30 is anchored to the tapered end of the axle shaft in a conventional manner. The seal retainer 27 may be of a conventional design employing the rigid plate portion against which the outer race of the bearing abuts and the central annular elastic portion which encircles the area 32 of the axle shaft for preventing escape of lubricants from within the end portion of the axle tube.

Figure 2:
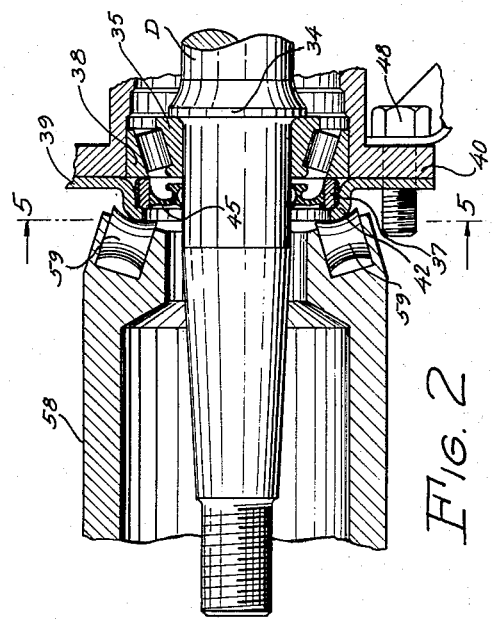
FIGURE 2 is a fragmentary detail sectional view showing a further step in effecting assembly.
Figure 6:
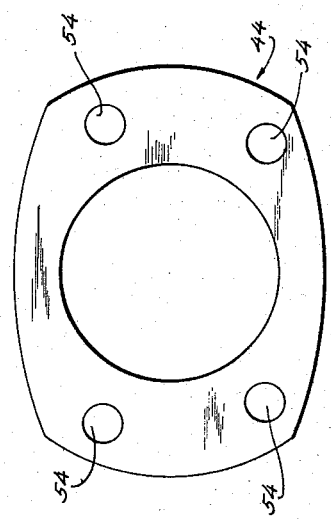
FIGURE 6 is a detail view of the shim which determines axle end play.
Figure 1:
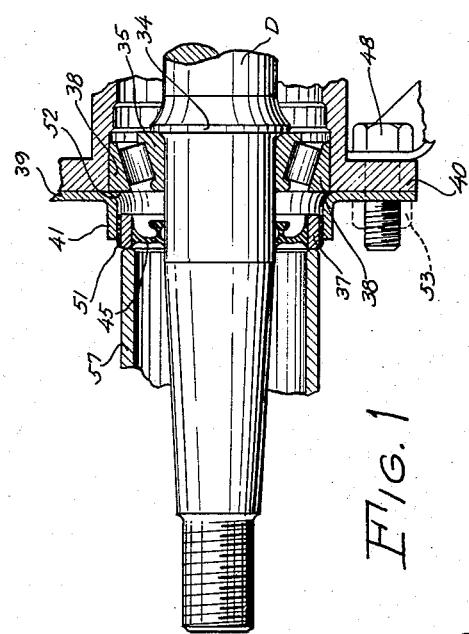
FIGURE 1 is a fragmentary detail sectional view of one end of the axle assembly showing one of the steps in the method of effecting assembly.
Figure 5:
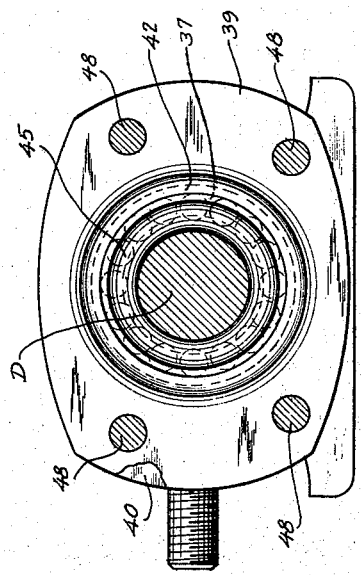
FIGURE 5 is an end view taken on the line 5—5 of FIGURE 2.
Figure 4:
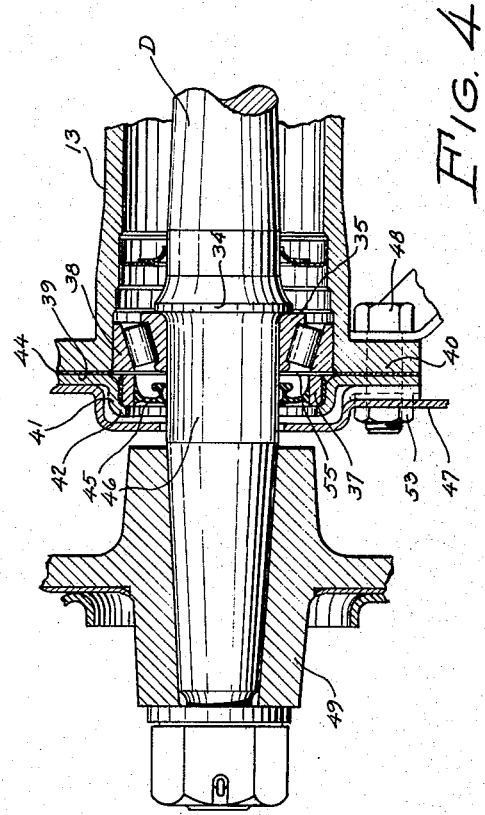
FIGURE 4 is an enlarged fragmentary sectional detail view of a portion of the apparatus in FIGURE 3.

At the outer end of the axle shaft D an annular shoulder 34 is formed against which the inner race 35 of the tapered roller bearing abuts. The seal is formed of an annular ring portion 37 of rigid material so that the annular end wall thereof serves as the shoulder or end support against which the annular end wall 52 of the outer race 38 of the bearing abuts. The annular ring portion of the seal is of a diameter greater than the inside diameter of the outer bearing race and less than the outside diameter of said race so as to serve as the end support for such bearing race. The outer circumference of the annular seal ring 37 may have a thin layer 51 of elastic material bonded thereto and the seal ring will have a snug fit when pressed into the seal retainer flange 41. Referring to FIGURES 1, 2 and 4, it should be noted that the thickness of the elastic coating 51 is exaggerated for purposes of clarity. The seal retainer is in the form of a rigid material having the radially outwardly extending mounting flange portion 39 which is bolted to the end wall 40 of the axle tube 13. The mounting portion of the seal retainer merges with the axially extending central tubular portion 41, the outer end of which is turned radially inwardly at 42 to provide the end support flange against which the annular ring portion 37 of the seal abuts. A suitable shim or gasket 44 is interposed between the end face of the axle tube and the inner face of the mounting portion of the seal retainer and is installed in place with its bolt holes 54 guided onto the shanks of the bolts 48. Exteriorly of the retainer flange 39 is the brake shoe carrying plate 47, which is also guided onto the bolts 48 and then the nuts 53 are tightened on the bolts. The shim may have a thickness of about .006″, thereby establishing an end play clearance of about .006″ between the end wall 52 of the outer bearing race 38 and the inner end wall of the seal ring 37. The end play clearance is indicated in FIGURES 3 and 4 by the numeral 55 and is exaggerated for purposes of clarity. By accurately controlling the axial length of the seal ring 37, service replacement in the field can be effected without the need of shimming—the original .006″ shim being appropriate for the desired end play results when the replacement seal is installed. It will be understood that the lengths of the axle shafts, thrust block, seal ring 37 and the locating of the shaft shoulders 24 and 34 will be held sufficiently closely in relation to the dimension X (from end to end of the axle tubes) in order that a uniform thickness of shim can be used on successive axle assemblies. The elastic annular central portion 45 of the seal encircles the area 46 of the axle shaft to prevent the escape of lubricants from the end portion of the axle tube. The wheel hub 49 is removably secured to the end of the axle shaft in the same manner as wheel hub 30.

I claim:

1. For use in conjunction with a hollow housing having a mounting face at the end thereof, a shaft positioned within the housing and a bearing assembly having its inner race encircling the shaft and its outer race positioned within the housing, thereby rotatably supporting the shaft relative to the housing, means for sealing off the area between the outer surface of the shaft and the inner surface of the housing and for limiting axial movement of the outer race relative to the housing, said means including:

(a) a seal having a flexible annular portion encircling and engaging the shaft, said seal including a rigid annular portion carrying the flexible annular portion;

(b) an elastic coating on the exterior surface of the rigid annular portion;

(c) a seal retainer separate from the seal and having a portion anchored to the mounting face of the housing, said retainer having an axially extending tubular portion encircling the annular rigid portion of the seal and having a snug fit relative thereto;

(d) the inner end face of the annular rigid portion of the seal being exposed to and engaged by the outer race of the bearing to limit axial movement of the bearing and shaft relative to the housing.

2. For use in conjunction with a hollow housing having a mounting face at the end thereof, a shaft positioned within the housing and a bearing assembly having its inner race encircling the shaft and its outer race positioned within the housing, thereby rotatably supporting the shaft relative to the housing, means for sealing off the area between the outer surface of the shaft and the inner surface of the housing and for limiting axial movement of the outer race relative to the housing, said means including:

(a) a seal having a flexible annular portion encircling and engaging the shaft, said seal including a rigid annular portion carrying the flexible annular portion;

(b) an elastic coating on the exterior surface of the rigid annular portion;

(c) a seal retainer separate from the seal and having a portion anchored to the mounting face of the housing, said retainer having an axially extending tubular portion encircling the annular rigid portion of the seal and having a snug fit relative thereto;

(d) the inner end face of the annular rigid portion of the seal being exposed to and engaged by the outer race of the bearing to limit axial movement of the bearing and shaft relative to the housing;

(e) a radially inwardly directed flange at the outer end of the tubular portion of the retainer, said flange overhanging the outer end of the annular rigid portion of the seal and serving as an end support therefor.

3. For use in conjunction with a hollow housing having a mounting face at the end thereof, a shaft positioned within the housing and a bearing assembly having its inner race encircling the shaft and its outer race positioned within the housing, thereby rotatably supporting the shaft relative to the housing, means for sealing off the area between the outer surface of the shaft and the inner surface of the housing and for limiting axial movement of the outer race relative to the housing, said means including:

(a) a seal having a flexible annular portion encircling and engaging the shaft, said seal including a rigid annular portion carrying the flexible annular portion;

(b) a seal retainer separate from the seal and having a portion anchored to the mounting face of the housing, said retainer having an axially extending tubular portion encircling the annular rigid portion of the seal and having a snug fit relative thereto, the outside diameter of the annular rigid portion of the seal being greater than the inside diameter of the outer bearing race;

(c) the inner end face of the annular rigid portion of the seal being exposed to and engaged by the outer race of the bearing to limit axial movement of the bearing and shaft relative to the housing;

(d) a radially inwardly directed flange at the outer end of the tubular portion of the retainer, said flange overhanging the outer end of the annular rigid portion of the seal and serving as an end support therefor, and means interposed between the retainer and the axle housing for establishing a predetermined axial spacing between the inner end of the rigid annular portion of the seal and the outer race of the bearing assembly, thereby establishing the range of axial movement of the shaft relative to the housing.

4. For use in conjunction with a hollow housing having a mounting face at the end thereof, a shaft positioned within the housing and a bearing assembly having its inner race encircling the shaft and its outer race positioned within the housing, thereby rotatably supporting the shaft relative to the housing, means for sealing off the area between the outer surface of the shaft and the inner surface of the housing and for limiting axial movement of the outer race relative to the housing, said means including:

(a) a seal having a flexible annular portion encircling and engaging the shaft, said seal including a rigid annular portion carrying the flexible annular portion;

(b) a seal retainer separate from the seal and having a portion anchored to the mounting face of the housing, said retainer having an axially extending tubular portion encircling the annular rigid portion of the seal, the outside diameter of the annular rigid portion of the seal being greater than the inside diameter of the outer bearing race;

(c) the inner end face of the annular rigid portion of the seal being exposed to and engaged by the outer race of the bearing to limit axial movement of the bearing and shaft relative to the housing;

(d) a radially inwardly directed flange at the outer end of the tubular portion of the retainer, said flange overhanging the outer end of the annular rigid portion of the seal and serving as an end support therefor;

(e) a shim of pre-determined thickness interposed between the mounting face of the housing and the portion of the seal retainer which is anchored to the mounting face of the housing, the thickness of the shim establishing the range of axial movement of the shaft relative to the housing.

References Cited by the Examiner

UNITED STATES PATENTS

| | | | |
|---|---|---|---|
| 2,676,040 | 4/1954 | Dalton | 277—187 |
| 2,735,315 | 2/1956 | Zenker | 74—607 |
| 2,762,112 | 9/1956 | Kylen. | |
| 2,866,670 | 12/1958 | Harris et al. | 277—94 |
| 2,908,069 | 10/1959 | Richardson et al. | |
| 2,971,398 | 2/1961 | Sieving | 74—607 |
| 2,982,999 | 5/1961 | Stewart | 277—182 |
| 3,025,716 | 3/1962 | Muller | 74—607 |

FOREIGN PATENTS 700,811   12/1953   Great Britain.

BROUGHTON G. DURHAM, *Primary Examiner.*